US011425656B2

(12) United States Patent
Zhang et al.

(10) Patent No.: US 11,425,656 B2
(45) Date of Patent: Aug. 23, 2022

(54) METHOD AND DEVICE FOR HANDLING WAKE-UP SIGNALS

(71) Applicant: Telefonaktiebolaget LM Ericsson (publ), Stockholm (SE)

(72) Inventors: Jingcheng Zhang, Svärtinge (SE); Miguel Lopez, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 14 days.

(21) Appl. No.: 16/628,536

(22) PCT Filed: Dec. 21, 2017

(86) PCT No.: PCT/SE2017/051327
§ 371 (c)(1),
(2) Date: Jan. 3, 2020

(87) PCT Pub. No.: WO2019/009774
PCT Pub. Date: Jan. 10, 2019

(65) Prior Publication Data
US 2020/0196244 A1 Jun. 18, 2020

Related U.S. Application Data

(60) Provisional application No. 62/529,012, filed on Jul. 6, 2017.

(51) Int. Cl.
*H04W 12/06* (2021.01)
*H04W 52/02* (2009.01)
*H04W 12/037* (2021.01)

(52) U.S. Cl.
CPC ..... *H04W 52/0235* (2013.01); *H04W 12/037* (2021.01); *H04W 12/06* (2013.01)

(58) Field of Classification Search
CPC ... H04W 12/00; H04W 12/02; H04W 12/062; H04W 12/065; H04W 12/069;
(Continued)

(56) References Cited

U.S. PATENT DOCUMENTS 10,445,107 B2 * 10/2019 Sun ................ H04W 76/11
2008/0170569 A1 7/2008 Garg et al.
(Continued)

FOREIGN PATENT DOCUMENTS

EP 2 400 799 A2 12/2011

OTHER PUBLICATIONS

International Search Report and Written Opinion dated Apr. 9, 2018 issued in International Application No. PCT/SE2017/051327. (13 pages).
(Continued)

*Primary Examiner* — Jean A Gelin
(74) *Attorney, Agent, or Firm* — Rothwell, Figg, Ernst & Manbeck, P.C.

(57) ABSTRACT

A wireless device and methods for handling wake-up signaling is presented. The wireless device is configured to receive a wake-up signal comprising wake-up information and authentication information, determine whether the wake-up signal is intended for the wireless device based on the wake-up information, and determine whether the wake-up signal is authentic based on the authentication information. Upon determining that the wake-up signal is intended for the wireless device and determining that the wake-up signal is authentic, the wireless device is further configured to initiate wake-up of radio circuitry comprised in the wireless device. Related computer program, computer program product and carrier are also described.

13 Claims, 6 Drawing Sheets

(58) Field of Classification Search
CPC ....... H04W 12/108; H04W 4/70; H04W 4/80; H04W 52/0235; H04W 52/0029; H04W 52/02
See application file for complete search history.

(56) References Cited

U.S. PATENT DOCUMENTS

| | | | |
|---|---|---|---|
| 2009/0238559 A1* | 9/2009 | Pfeiffer | H04B 10/807 398/17 |
| 2013/0110008 A1* | 5/2013 | Bourget | A61B 5/11 600/595 |
| 2014/0086124 A1 | 3/2014 | Knowles | |
| 2014/0208132 A1 | 7/2014 | Cheston et al. | |
| 2015/0212562 A1* | 7/2015 | Guichard | H04L 12/12 713/310 |
| 2016/0007288 A1 | 1/2016 | Samardzija et al. | |
| 2016/0278013 A1 | 9/2016 | Shellhammer et al. | |
| 2016/0295512 A1 | 10/2016 | Hara et al. | |
| 2016/0337964 A1* | 11/2016 | Mochizuki | H04W 16/32 |
| 2017/0134943 A1 | 5/2017 | Min et al. | |
| 2018/0018185 A1 | 1/2018 | Sun et al. | |
| 2018/0063788 A1* | 3/2018 | Yang | H04W 12/108 |
| 2019/0066422 A1* | 2/2019 | Breer | G07C 9/00309 |
| 2020/0053647 A1* | 2/2020 | Chae | H04W 72/0446 |
| 2020/0145921 A1* | 5/2020 | Zhang | H04W 76/27 |

OTHER PUBLICATIONS

Han, Y. et al., "WUR Security Proposal", Huawei, Doc.: IEEE 802.11-17/0660r0; May 2017. (9 pages).

Park, M., "LP-WUR (Low-Power Wake-Up Receiver) Follow-Up", Intel Corporation, Doc.: IEEE 802.11-16/0341r0; Mar. 2016. (9 pages).

Extended European Search Report, dated Jun. 9, 2020 issued in European Patent Application No. 17917186.3. (8 pages).

* cited by examiner

METHOD AND DEVICE FOR HANDLING WAKE-UP SIGNALS

CROSS REFERENCE TO RELATED APPLICATION(S)

This application is a 35 U.S.C. § 371 National Stage of International Patent Application No. PCT/SE2017/051327, filed Dec. 21, 2017, designating the United States and claiming priority to U.S. provisional application No. 62/529,012, filed on Jul. 6, 2017. The above identified applications are incorporated by reference.

TECHNICAL FIELD

The present disclosure relates to methods and devices for handling wake-up signals in wireless communication systems. Furthermore, a computer program, a computer program product, and a carrier are also provided herein.

BACKGROUND

Internet of Things (IoT) is expected to increase the number of connected devices significantly. A large number of these IoT devices are expected to be powered by coin-cell batteries, which means that energy consumption is of outmost importance. In the future, it may even be so that these devices will be able to harvest their energy themselves, potentially even further increasing the importance of low energy consumption.

For these kind of applications, the supported data rates are low, both concerning peak data rates and aggregated data rate during, say, an average day. This means that major part of the power is not consumed when the IoT device is transmitting or receiving data, but rather when the devices are listening to determine whether there might be a transmission for which it is the intended receiver.

The fact that such a large part of the total energy consumption is due to listening for a potential transmission, just to find out that the transmission is not there, has motived the development of so-called wake-up receivers (WUR). A WUR is a device which has extremely low power consumption and whose only purpose is to wake up the primary transceiver. Hence, an IoT device with a WUR will not need to turn on the primary receiver to scan for a potential packet, but will instead turn on the WUR. If in fact there is data for the IoT device, a wake-up signal (WUS) will be sent to the WUR. When the WUR has decoded this WUS, it can determine whether there is data present and it will proceed to wake up the main receiver and transmitter, and a communication link can be established.

In document "LP-WUR (Low-Power Wake-Up Receiver) Follow-Up", IEEE 802.11-16/0341r0, Mar. 14, 2016, the Low-Power Wake-Up Receiver (LP-WUR) concept has been proposed as a companion radio for IEEE 802.11 technology, and it is being currently standardized by the IEEE 802.11 task group TGba. The purpose is to reduce the power consumption of the Wi-Fi stations (STA's).

When the LP-WUR is turned on and waiting for the wake-up signal (WUS) (herein also called wake-up message), the IEEE 802.11 chipset can be switched off to preserve power. Once the wake-up signal is received by the LP-WUR, it wakes up the IEEE 802.11 main radio, also called primary radio or primary communication radio, and starts Wi-Fi communication with the Access Point (AP).

An LP-WUR is a simple and inexpensive enhancement to the main radio in remote wireless nodes. It has good potential to reduce the power consumption of the receiving device.

One problem with LP-WUR's is that they are vulnerable to security attacks. The WUR wakes up the main radio every time that the expected WUS is received. If the WUS never changes, the attacker can continuously send fake wake up messages in order to activate the main radio. As a result, the battery lifetime of the remote node is decreased dramatically.

To solve this problem, there have been security proposals that set the basic requirements of the WUR and the corresponding wake-up message, as shown e.g. in document "WUR Security Proposal", IEEE 802.11-17/0660r0, May 8, 2017:

The WUR address should be long enough.
The WUR address should be changed frequently, preferably changed during every wake-up event.
During every wake-up event, the STA and the AP should verify the authenticity of the message(s) from each other before assigning or using the new WUR address for the STA's next wake-up event.

While these solutions alleviate the security vulnerabilities discussed above, they are still costly, in terms of energy consumption or product development costs.

SUMMARY

When assessing the proposals of the known art in more detail, some further drawbacks are revealed.
Radio operations are always involved in the wake-up signal authentication.
For example, the security proposals always require the STA to exchange messages with the AP during the authentication procedure. Although this can prevent the STA report information to the malicious attacker, the initial message exchanges are inevitable. Message exchange over radio is very power consuming, so the radio operations should be minimized during the wake-up message authentication procedures to save battery energy.
Extra authentication method increases the cost.
Implementing a standalone wake-up message authentication method might solve the problem mentioned above. However, it increases the complexity of the WUR by adding extra security mechanism. One possible implementation is to add extra dedicated hardware component for wake-up message authentication. It is a self-contained solution that introduces extra hardware cost. Alternatively, the security method can be implemented in the attached radio chips. However, this requires the WUR authentication method to be implemented in every technology in order to use this feature. The performance is hardware dependent and the security mechanism could potentially to be too complicated for some very simple and low performance micro-processor.
It is difficult to have a "one for all" algorithm for the WUR in all possible applications.
Although the WUR concept is firstly proposed in IEEE 802.11 working group, it is a concept that could be potentially utilized in many other technologies which require long term message listening but also low power consumption. Even for the same technology, the security level for the wake-up message could be different for different applications. In this case, it is difficult to use a single security mechanism to match all the security requirements of the wake-up message.

It is an object to provide methods and devices with improved handling of wake-up signals.

This and other objects are met by embodiments of the present disclosure.

According to a first aspect, there is provided a wireless device for handling wake-up signaling. The wireless device is configured to receive a wake-up signal comprising wake-up information and authentication information, determine whether the wake-up signal is intended for the wireless device based on the wake-up information, and determine whether the wake-up signal is authentic based on the authentication information. Upon determining that the wake-up signal is intended for the wireless device and determining that the wake-up signal is authentic, the wireless device is further configured to initiate wake-up of radio circuitry comprised in the wireless device.

According to a second aspect, there is provided a method performed by a wireless device for handling wake-up signaling. The method comprises receiving a wake-up signal comprising wake-up information and authentication information. The wireless device determines, based on the wake-up information, whether the wake-up signal is intended for the wireless device. The wireless device further determines, based on the authentication information, whether the wake-up signal is authentic. Upon determining that the wake-up signal is intended for the wireless device and determining that the wake-up signal is authentic, the wireless device initiates wake-up of radio circuitry comprised in the wireless device.

According to a third aspect, there is provided a wireless device for handling wake-up signaling. The wireless device comprises a receiving module for receiving a wake-up signal comprising wake-up information and authentication information, a first determining module for determining whether the wake-up signal is intended for the wireless device based on the wake-up information. The wireless device also comprises a second determining module for determining whether the wake-up signal is authentic based on the authentication information. The wireless device further comprises a first initiating module for initiating wake-up of radio circuitry comprised in the wireless device upon determining that the wake-up signal is intended for the wireless device and determining that the wake-up signal is authentic.

According to a fourth aspect, there is provided a computer program comprising instructions which, when executed by at least one processor of a wireless device causes the wireless device to carry out the method of the second aspect.

According to a fifth aspect, there is provided a computer program product comprising a computer-readable medium having stored there on a computer program of according to the fourth aspect.

According to a sixth aspect, there is provided a carrier containing the computer program according to the fourth aspect, wherein the carrier is one of an electric signal, optical signal, radio signal, or computer readable storage medium.

Disclosed herein are devices and methods with improved handling of wake-up signals. Some methods herein may find particular use for constraint devices, having limited power resources. Embodiments herein provide several advantages. Some embodiments may for example avoid introducing any extra hardware component for wake-up message authentication and/or do not reinvent any dedicated algorithm for wake-up message authentication. Embodiments may also provide a flexible architecture that can reuse the existing security mechanism that are already implemented in the radio technology, e.g. for authenticating the received wake-up signal. A further potential advantage is the optimization of the power consumption by minimizing the radio operations.

DETAILED DESCRIPTION

The proposed technology will now be described more fully hereinafter with reference to the accompanying drawings, in which certain embodiments of the technology are shown. This proposed technology may, however, be embodied in many different forms and should not be construed as limited to the embodiments set forth herein; rather, these embodiments are provided by way of example so that this disclosure will be thorough and complete, and will fully convey the scope of the technology to those skilled in the art. Like numbers refer to like elements throughout the description. Any step or feature illustrated by dashed lines should be regarded as optional.

In the following description, explanations given with respect to one aspect of the present disclosure correspondingly apply to the other aspects.

Figure 1:
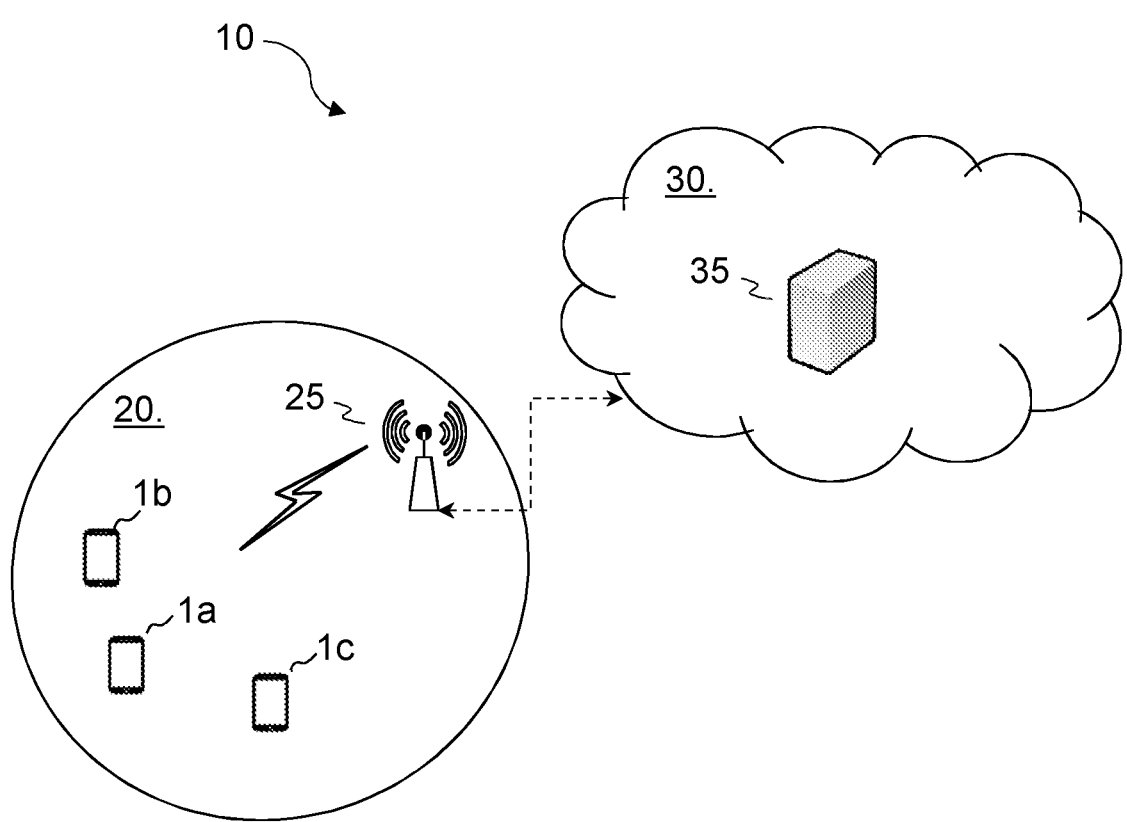
FIG. 1 illustrates schematically a wireless communication system.

FIG. 1 illustrates schematically an example wireless communication system 10 in which embodiments according to the present teachings may be implemented. The wireless communication system 10 includes wireless devices 1a, 1b, 1c in communication with one or more access nodes 25, which together may operate as an access network 20. The access network 20 may use a number of different technologies, such as Wi-Fi, Bluetooth Low Energy, ZigBee, LoRA, 3GPP, just to mention a few possible implementations. The access node 25 may be a Wireless Local Area Network (WLAN) Access Point (AP), a stand-alone AP or any other network unit capable of providing the wireless device 1a, 1b, 1c within the access network 20 access to the wireless communication system 10. The one or more network nodes 25 of the access network may further communicate with one or more nodes 35 of a core network 30. As such, the term "network node" can be substituted for the term "network nodes" as used herein. It will be appreciated that the wireless communication system 10 comprises additional components not illustrated in FIG. 1.

In particular embodiments, the wireless device, refers herein to a device capable, configured, arranged and/or operable to communicate wirelessly with network nodes and/or other wireless devices. Communicating wirelessly may involve transmitting and/or receiving wireless signals using electromagnetic signals, radio waves, infrared signals, and/or other types of signals suitable for conveying information through air.

In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, user equipment (UE), smart phone, mobile phone, cell phone, voice over IP (VoIP) phone, wireless local loop phone, desktop computer, personal digital assistant (PDA), wireless cameras, gaming terminal devices, music storage, playback appliances, wearable terminal devices, wireless endpoints, mobile stations, tablets, laptops, laptop-embedded equipment (LEE), laptop-mounted equipment (LME), smart devices, wireless customer-premise equipment (CPE) and vehicle-mounted wireless terminal devices. A wireless device may support device-to-device (D2D) communication, for example by implementing a 3GPP standard for sidelink communication, and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

Figure 2:
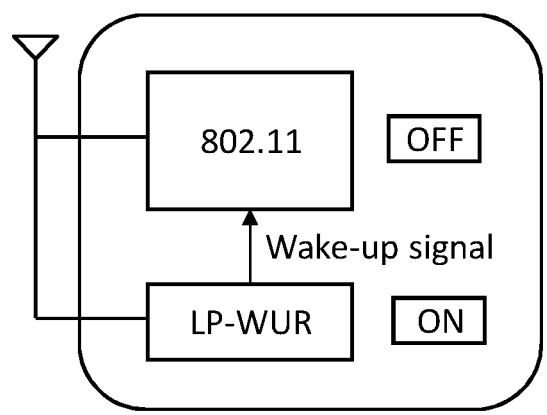
FIG. 2 illustrates a wireless device known in the art.

FIG. 2 illustrates a wireless device known in the art comprising an LP-WUR. As shown, the LP-WUR and the IEEE 802.11 radio share the same antenna. When the LP-WUR is turned on and waiting for the wake-up message, the IEEE 802.11 chipset can be switched off to preserve power. Once the wake-up message is received by the LP-WUR, it wakes up the IEEE 802.11 main radio and starts Wi-Fi communication with the Access Point (AP).

Figure 3:
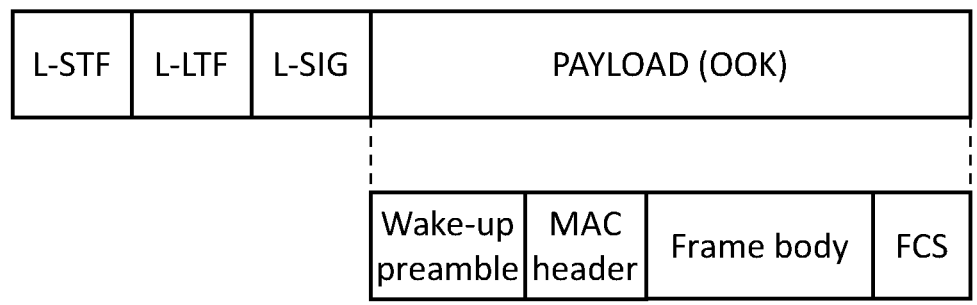
FIG. 3 illustrates an exemplary WUS packet format.

FIG. 3 shows an example of a wake-up message packet format when the LP-WUR works together with an IEEE 802.11 chip. The L-STF, L-LTF and L-SIG fields are based on Orthogonal Frequency-Division Multiplexing (OFDM) modulation and the payload part is based on On-Off Keying (OOK). The legacy IEEE 802.11 preamble is inserted at the beginning of the packet in order to provide a co-existence mechanism with IEEE 802.11 legacy stations. Within the payload part, there are a wake-up preamble for packet detection (and possibly other functions, e.g. to indicate the message type), a Media Access Control (MAC) header that indicates the device address and a frame body that could include some control message. The wake-up message is ended with a Frame Check Sequence (FCS) that validates the received message integrity.

Instead of defining a dedicated algorithm for the wake-up message authentication, one embodiment herein proposes an updated LP-WUR—main radio chipset communication method. The proposed method allows the system to reuse the existing security mechanisms in the radio protocol to authenticate the wake-up message.

Figure 4:
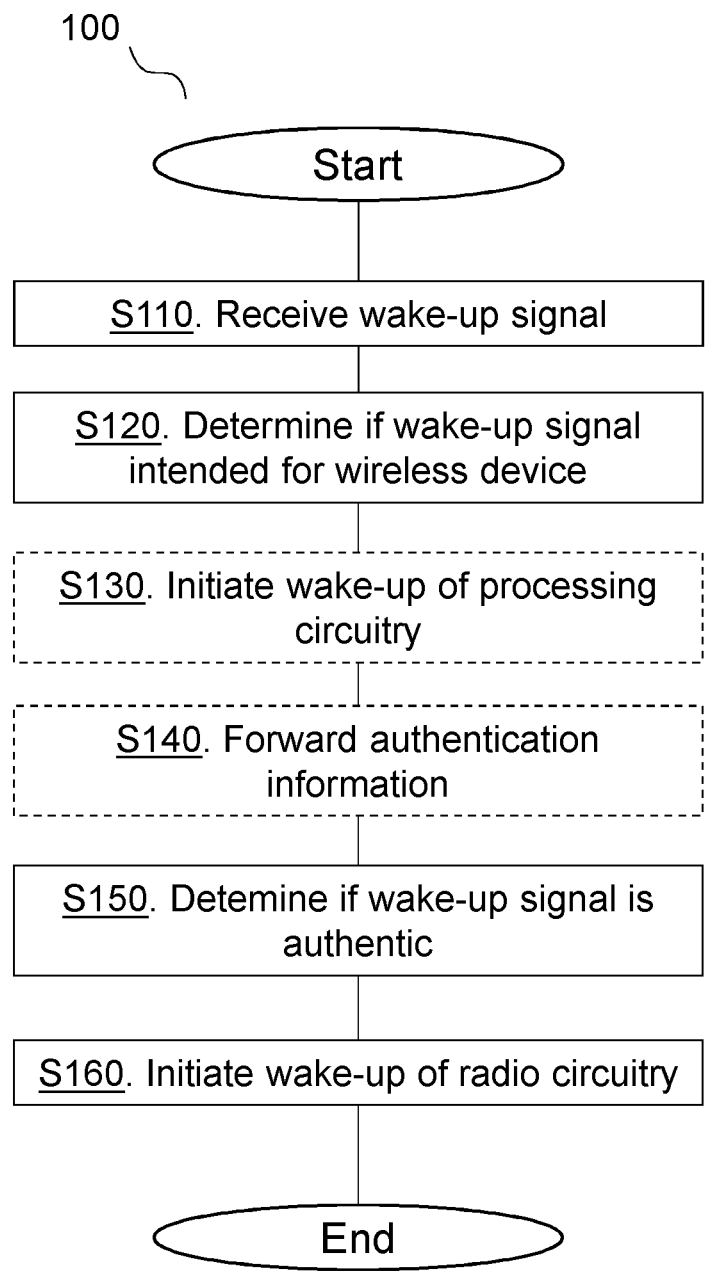
FIG. 4 is a flowchart depicting a method performed by a wireless device according to one or more embodiments.

FIG. 4 depicts a method 100 performed by a wireless device for handling wake-up signaling according to one or more embodiments. In S110 the wireless device receives a wake-up signal comprising wake-up information and authentication information. In S120 the wireless determines, based on the wake-up information, whether the wake-up signal is intended for the wireless device and further determines S150 whether the wake-up signal is authentic based on the authentication information. When the wireless device determines that the wake-up signal is intended for the wireless device and determines that the wake-up signal is authentic, it initiates in S160 wake-up of radio circuitry comprised in the wireless device. By this method, the wireless device need not wake up the main radio, also called primary radio or primary communication radio, of the device, unless the wake-up signal is intended for the wireless device and the signal has been authenticated properly, thereby avoiding unnecessary consuming of the device's, possibly limited, power resources.

In a specific embodiment, the method 100 further comprises, upon determining S120 that the wake-up signal is intended for the wireless device, the interface circuitry forwards in S140 the authentication information from interface circuitry to processing circuitry comprised in the wireless device for initiating wake-up of radio circuitry comprised in the wireless device. The authentication information is thus made available to the processing circuitry, enabling the processing circuitry to determine whether the wake-up signal is authentic. As an option the method may further comprise, upon determining in S120 that the wake-up signal is intended for the wireless device, the interface circuitry initiates in step S130 wake-up of the processing circuitry before forwarding the authentication information from interface circuitry to processing circuitry. Thereby, the processing circuitry may remain in deep sleep mode until the interface circuitry has determined that the wireless device is actually the intended receiver of the wake-up signal, making even further reduction of power consumption possible.

Figure 5:
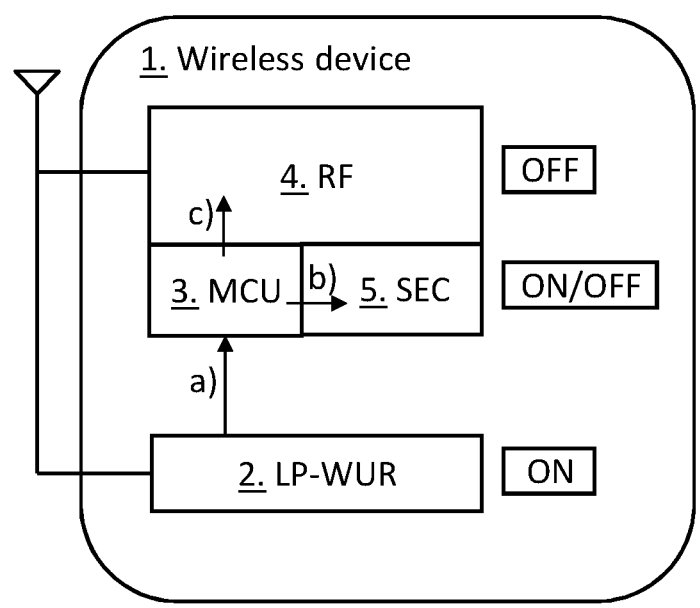
FIG. 5 illustrates schematically a wireless device according to some embodiments.

FIG. 5 illustrates the architecture of a wireless device according to a particular embodiment, using a radio that may be compliant with the IEEE 802.11 standard as a non-limiting example. When the interface circuitry, e.g. an LP-WUR, 2 is turned on and waiting for the wake-up signal, the other radio (RF) 4, e.g., an IEEE 802.11 radio chip, can go to deep sleep mode to save power. The communication between the interface circuitry 2 and the processing circuitry 3, (denoted "a" in FIG. 5) may be any communication protocol that could be utilized as external interrupt that wakes up the processing circuitry from the deep sleep mode. Such protocols can be Universal Asynchronous Receiver/Transmitter (UART), Inter-Integrated Circuit (I2C) or Serial Peripheral Interface bus (SPI) and so on. The message payload carried by the wake-up message and received by the interface circuitry 2 can be transmitted to the processing circuitry 3 using this interface. The processing circuitry 3 may for example comprise an IEEE 802.11 Microprocessor Unit (MCU), Thus, according to some embodiments, instead of a power switch function, the WUR communicates with the radio chip via communication protocols that may wake up the microprocessor part of the radio chip from deep sleep mode, e.g., UART, I2C or SPI, as mentioned above. The radio part of the main radio chip is not activated.

As an example, the security level of the wake-up message may be configured over the main radio ("primary communication radio") protocol, e.g., IEEE 802.11 protocol. As a separate receiver, the communication between the wake-up message transmitter and the wake-up message receiver is not terminated even if the IEEE 802.11 radio is turned off. Such message can be considered as a separated session in parallel with other IEEE 802.11 communications. In this case, once a wake-up message is received, it goes through the same authentication procedure as agreed between peer nodes and the shared credentials. Once the credential needs to be updated, i.e., key update or initial vector update, the same procedure defined for the main radio protocol, e.g., IEEE 802.11 may also be reused in wake-up message credential update. The hardware is sometimes equipped with dedicate hardware accelerator, in FIG. 5 denoted a SEcure Cryptoprocessor (SEC) 5, for encryption calculation. By using this architecture, the same security accelerator can be reused for wake-up message calculation, e.g. authentication and/or validation, as well. In other words, the components, or at least some of the components, of the processing circuitry 3, for example such dedicated hardware, e.g., a SEC 5, may not need to be modified to perform the processing of the WUS.

Figure 6:
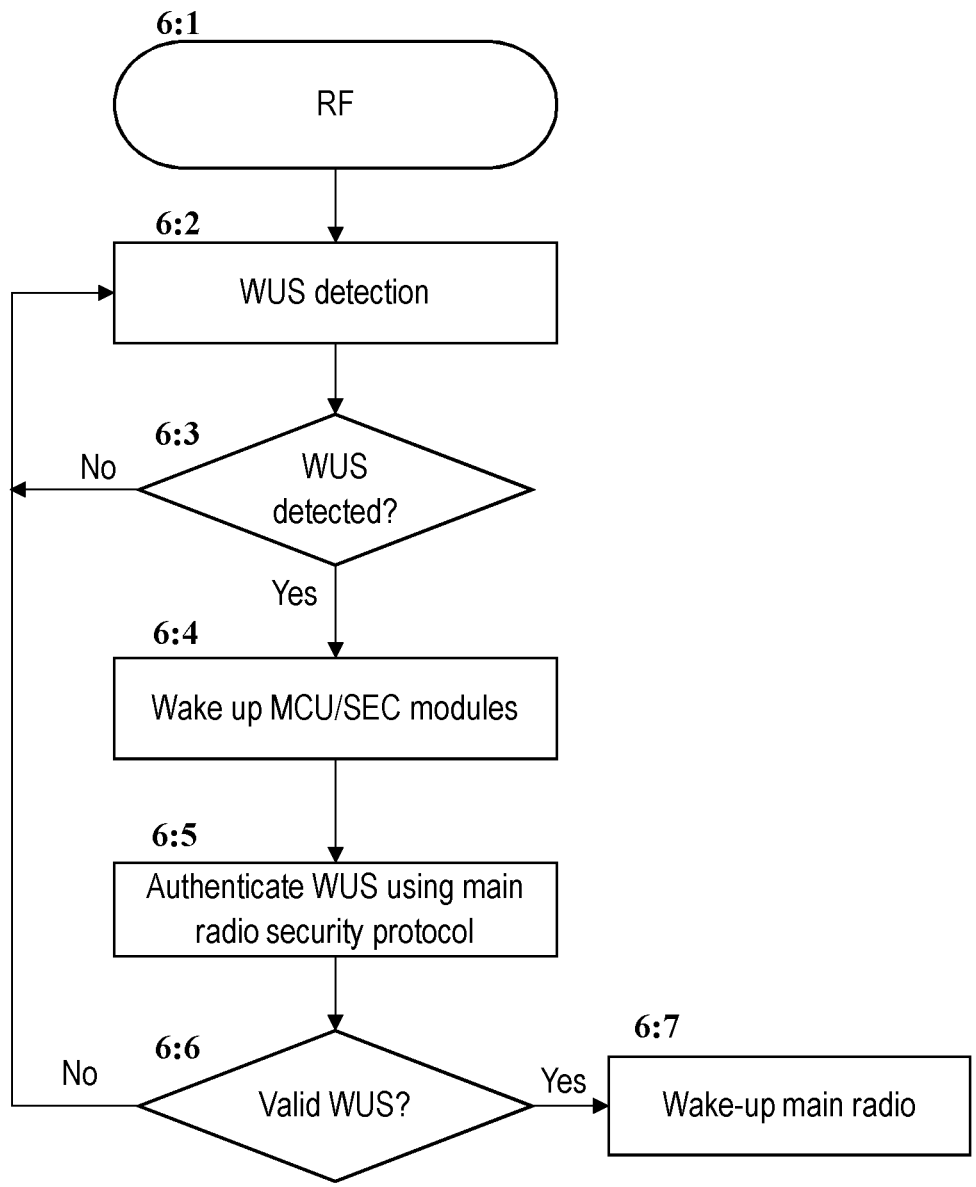
FIG. 6 is a flowchart depicting a method performed by a wireless device according to some embodiments.

No radio operation has been involved until now. The wake-up message only wakes up the MCU part of the IEEE 802.11 chip and possibly the security component (over interface denoted "b" in FIG. 5)) for authentication and/or encryption and decryption functionalities. If the received wake-up message passes the authentication, the MCU can wake up the IEEE 802.11 radio (over interface denoted "c" in FIG. 5). This exemplary procedure in the wireless device is illustrated in the flow diagram of FIG. 6 and further described below.

6:1 Radio circuitry, e.g. a main radio/primary communication radio (RF) such as an IEEE 802.11 radio chip, in the wireless device is in deep sleep mode to save power. The interface circuitry, e.g., a WUR or specifically an LP-WUR, is active.

6:2 A wake-up signal (WUS) is received, e.g. by an LP-WUR in the wireless device, which signal, as mentioned above, may comprise wake-up information and authentication information.

6:3 The wireless device determines, or "detects", whether the WUS is intended for the wireless device, e.g. based on the received authentication information.

6:4 When the WUS is not intended for the wireless device ("No"), the process returns to 6:2. When the WUS is intended for the wireless device ("Yes"), the wireless device wakes up processing circuitry, e.g. comprising a MCU module and a SEC module as in this example.

6:5 The WUS is then authenticated. As described above, this may be performed by processing circuitry comprised in the wireless device, and may specifically at least in part be performed by the SEC, which in this example is done using the main radio security protocol.

6:6 When the wireless device has determined that the WUS is authentic and intended for the wireless device, the WUS may be considered valid ("Yes") and the process continues to 6:7. Otherwise the WUS may be considered not valid ("No") and the process returns to 6:2.

6:7 The wireless device initiates wake-up of the main radio, e.g. using the MCU module comprised in the wireless device as described above.

Once 6:7 in the above procedure is completed and the radio circuitry/main radio has performed its tasks, the wireless device may perform additional steps. As one option, the wireless device may update security credential parameters between peer nodes, e.g., key refresh, nonce update and agreement, etc. Further, the radio circuitry may, once again, be turned off to save power. If the interface circuitry/WUR has been switched off during the procedure, it may now be turned on again, i.e. the procedure returns to 6:2.

The security level of the wake-up message may for example be configured during the initialization phase, via the communication between the AP and the STA. The security level and complexity depends on both the security requirement of the wakeup message and also the security implementation of the radio protocol. Afterwards, once a wake-up message is received by the LP-WUR, the received message can be authenticated using the already defined security mechanism of the radio protocol. The same security credential update mechanism can also be applied in the wake-up message when necessary.

Figure 7A:
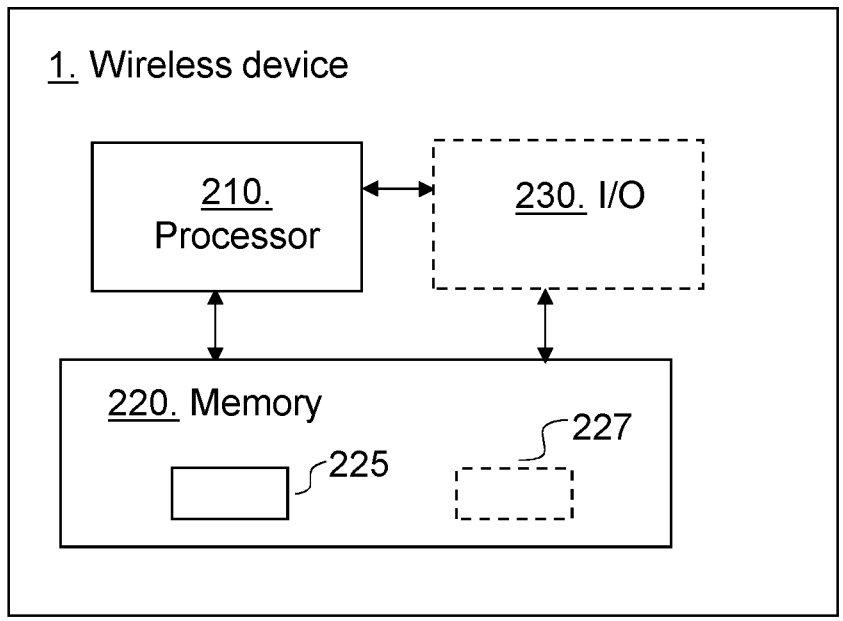
FIG. 7a illustrates schematically a wireless device and means for implementing some particular embodiments of the methods herein.

FIG. 7a is a schematic diagram illustrating an example of a computer implementation, in terms of functional units, the components of a wireless device 1 according to an embodiment. At least one processor 210 is provided using any combination of one or more of a suitable central processing unit (CPU), multiprocessor, microcontroller, digital signal processor (DSP), etc., capable of executing software instructions stored in a memory 220 comprised in the Wireless device 1. The at least one processor 210 may further be provided as at least one application specific integrated circuit (ASIC), or field programmable gate array (FPGA).

Particularly, the at least one processor is configured to cause the wireless device to perform a set of operations, or actions, S110-S160, and in some embodiments also optional actions, as described above. For example, the memory 220 may store the set of operations 225, and the at least one processor 210 may be configured to retrieve the set of operations 225 from the memory 220 to cause the wireless device 1 to perform the set of operations. The set of operations may be provided as a set of executable instructions. Thus the at least one processor 210 is thereby arranged to execute methods as herein disclosed.

The memory 220 may also comprise persistent storage 227, which, for example, can be any single one or combination of magnetic memory, optical memory, solid state memory or even remotely mounted memory.

The wireless device 1 may further comprise an input/output unit 230 for communications with resources, arrangements or entities of the wireless communication system. As such the input/output unit 230 may comprise one or more transmitters and receivers, comprising analogue and digital components. The input/output unit 230 may thus, at least in part, comprise the LP-WUR, and/or the radio circuitry.

The at least one processor 210 controls the general operation of the wireless device 1, e.g., by sending data and control signals to the input/output unit 230 and the memory 220, by receiving data and reports from the input/output unit 230, and by retrieving data and instructions from the memory 220. Other components, as well as the related functionality, of the wireless device 1 are omitted in order not to obscure the concepts presented herein.

In this particular example, at least some of the steps, functions, procedures, modules and/or blocks described herein are implemented in a computer program, which is loaded into the memory 220 for execution by processing circuitry including one or more processors 210. The memory 220 may comprise, such as contain or store, the computer program. The processor(s) 210 and memory 220 are interconnected to each other to enable normal software execution. An input/output unit 230 is also interconnected to the processor(s) 210 and/or the memory 220 to enable input and/or output of data and/or signals.

The term 'processor' should herein be interpreted in a general sense as any system or device capable of executing program code or computer program instructions to perform a particular processing, determining or computing task.

The processing circuitry does not have to be dedicated to only execute the above-described steps, functions, procedure and/or blocks, but may also execute other tasks.

Figure 7B:
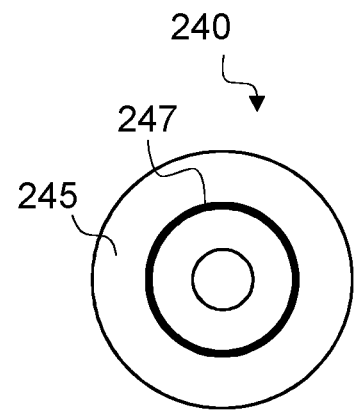
FIG. 7b illustrates schematically an example of a computer program product comprising computer readable means according to certain embodiments.

FIG. 7b shows one example of a computer program product 240 comprising a computer readable storage medium 245, in particular a non-volatile medium. On this computer readable storage medium 245, a computer program 247 can be carried or stored. The computer program 247 can cause processing circuitry including at least one processor 210 and thereto operatively coupled entities and devices, such as the input/output unit 230 and the memory 220, to execute methods according to some embodiments described herein. The computer program 247 and/or computer program product 240 may thus provide means for performing any actions of the wireless device 1 herein disclosed.

The flow diagram or diagrams presented herein may be regarded as a computer flow diagram or diagrams, when performed by one or more processors. A corresponding apparatus may be defined as a group of function modules, where each step performed by the processor 210 corresponds to a function module. In this case, the function modules are implemented as a computer program running on the processor 210.

The computer program residing in memory 220 may thus be organized as appropriate function modules configured to perform, when executed by the processor 210, at least part of the steps and/or tasks.

Figure 7C:
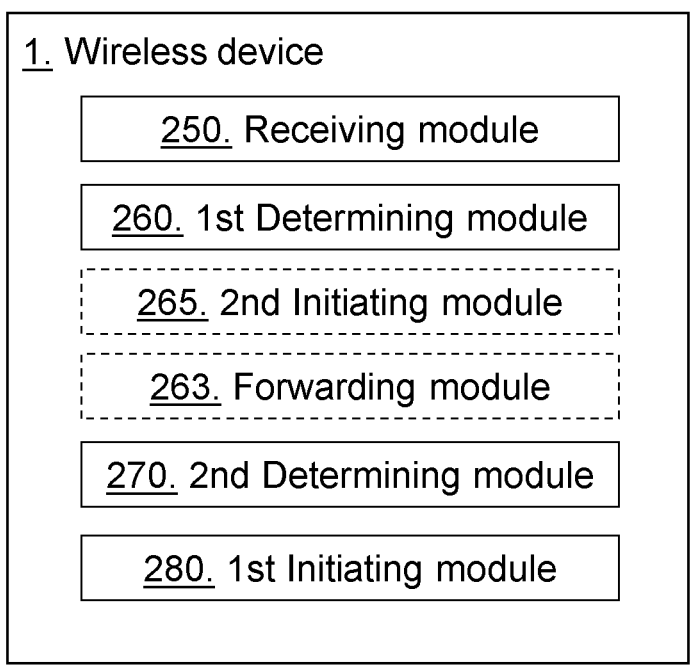
FIG. 7c illustrates schematically a memory allocator comprising function modules/software modules for implementing particular embodiments.

FIG. 7c is a schematic diagram illustrating, in terms of a number of functional modules, an example of a wireless device 1 for handling wake-up signaling. The wireless device 1 comprises a receiving module 250 for receiving a wake-up signal comprising wake-up information and authentication information; a first determining 260 module for determining whether the wake-up signal is intended for the wireless device based on the wake-up information; a second determining 270 module for determining whether the wake-up signal is authentic based on the authentication information; and a first initiating module 280 for initiating wake-up of radio circuitry comprised in the wireless device upon determining that the wake-up signal is intended for the wireless device and determining that the wake-up signal is authentic.

In one embodiment, the wireless device 1 further comprises a forwarding module 263 for forwarding the authentication information from interface circuitry to processing circuitry comprised in the wireless device for initiating wake-up of radio circuitry comprised in the wireless device, upon determining that the wake-up signal is intended for the wireless device. Optionally, the wireless device 1 may further comprises a second initiating module 265 for initiating wake-up of the processing circuitry before forwarding the authentication information from the interface circuitry to the processing circuitry, upon determining that the wake-up signal is intended for the wireless device.

In general terms, each functional module 250-280 may be implemented in hardware or in software. Preferably, one or more or all functional modules 250-280 may be implemented by at least one processor 210, possibly in cooperation with functional units 220 and/or 230. The at least one processor 210 may thus be arranged to fetch from the memory 220 instructions as provided by a functional module 250-280 and to execute these instructions, thereby performing any actions of the wireless device 1 as disclosed herein.

Alternatively, it is possible to realize the module(s) in FIG. 7c predominantly by hardware modules, or alternatively by hardware, with suitable interconnections between relevant modules. Particular examples include one or more suitably configured processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending data and/or signals. The extent of software versus hardware is purely implementation selection.

Thus, proposed herein in one particular embodiment is a receiver architecture for a wireless device, comprising an LP-WUR, a main radio, an MCU and a SEC, where the MCU/SEC can be woken up without waking up the main radio. The architecture further comprises a communications interface between the LP-WUR and the MCU/SEC, and means for the LP-WUR to turn ON/OFF the MCU/SEC.

Also proposed herein, in a specific embodiment, is a method of LP-WUR and radio chip communication. It allows reuse the security mechanisms defined in the main radio protocol to authenticate a wake-up message. The wake-up message may be configured by the main radio protocol. The received wake-up message payload may be transmitted and authenticated by the main radio chip using the security method defined in the main radio protocol.

LP-WUR's are of interest not only for modems based on IEEE standards. Indeed, there is growing interest in the applicability of LP-WUR to 3GPP technologies, in order to decrease the power consumption of NarrowBand IoT (NB-IoT) and enhanced MTC (eMTC) devices.

The present embodiments may, of course, be carried out in other ways than those specifically set forth herein without departing from essential characteristics of the proposed technology. The present embodiments are to be considered in all respects as illustrative and not restrictive, and all changes coming within the meaning and equivalency range of the appended enumerated embodiments are intended to be embraced therein.

The invention claimed is:

1. A wireless device for handling wake-up signaling, wherein the wireless device is configured to:
receive a wake-up signal comprising: i) wake-up information for enabling the wireless device to determine whether the wake-up signal is intended for the wireless device and ii) authentication information for enabling the wireless device to determine whether or not the wake-up message is authentic, wherein the wake-up information is separate from the authentication information;
determine whether the wake-up signal is intended for the wireless device based on the wake-up information; and
after and as a result of determining that the wake-up signal is intended for the wireless device, determine whether the wake-up signal is authentic based on the authentication information;

wherein, after determining that the wake-up signal is intended for the wireless device and determining that the wake-up signal is authentic, the wireless device is further configured to initiate wake-up of radio circuitry comprised in the wireless device.

2. The wireless device of claim 1, wherein the wireless device comprises:
  interface circuitry configured to:
  receive the wake-up signal comprising wake-up information and authentication information; and
  determine whether the wake-up signal is intended for the wireless device based on the wake-up information; and
  processing circuitry configured to:
  determine whether the wake-up signal is authentic based on the authentication information;
  wherein, upon determining that the wake-up signal is intended for the wireless device, the interface circuitry is further configured to forward the authentication information to the processing circuitry; and
  upon determining that the wake-up signal is authentic, the processing circuitry is further configured to initiate wake-up of the radio circuitry comprised in the wireless device.

3. The wireless device of claim 2, wherein, upon determining that the wake-up signal is intended for the wireless device, interface circuitry is further configured to initiate wake-up of the processing circuitry before forwarding the authentication information to the processing circuitry.

4. The wireless device of claim 2, wherein the processing circuitry comprises a microprocessor unit configured to initiate wake-up of the radio circuitry.

5. The wireless device of claim 2, wherein the processing circuitry comprises a Secure Cryptoprocessor configured to determine whether the wake-up signal is authentic based on the authentication information.

6. The wireless device of claim 2, wherein the interface circuitry is configured to wake-up the processing circuitry over a communications interface between the interface circuitry and the processing circuitry.

7. A method performed by a wireless device for handling wake-up signaling, wherein the method comprises:
  receiving a wake-up signal comprising: i) wake-up information for enabling the wireless device to determine whether the wake-up signal is intended for the wireless device and ii) authentication information for enabling the wireless device to determine whether or not the wake-up message is authentic, wherein the wake-up information is separate from the authentication information;
  determining whether the wake-up signal is intended for the wireless device based on the wake-up information;
  after and as a result of determining that the wake-up signal is intended for the wireless device, determining whether the wake-up signal is authentic based on the authentication information; and
  after determining that the wake-up signal is intended for the wireless device and determining that the wake-up signal is authentic, initiating wake-up of radio circuitry comprised in the wireless device.

8. The method of claim 7, wherein the method further comprises:
  upon determining that the wake-up signal is intended for the wireless device, forwarding the authentication information from interface circuitry to processing circuitry comprised in the wireless device for initiating wake-up of radio circuitry comprised in the wireless device.

9. The method of claim 8, wherein the method further comprises:
  upon determining that the wake-up signal is intended for the wireless device, initiating wake-up of the processing circuitry before forwarding the authentication information from interface circuitry to processing circuitry.

10. A computer program product comprising a non-transitory computer readable medium storing a computer program comprising instructions which, when executed by at least one processor of a wireless device causes the wireless device to carry out the method of claim 7.

11. A wireless device for handling wake-up signaling, wherein the wireless device comprises:
  a receiver for receiving a wake-up signal comprising: i) wake-up information for enabling the wireless device to determine whether the wake-up signal is intended for the wireless device and ii) authentication information for enabling the wireless device to determine whether or not the wake-up message is authentic, wherein the wake-up information is separate from the authentication information;
  a first determining module for determining whether the wake-up signal is intended for the wireless device based on the wake-up information;
  a second determining module for determining whether the wake-up signal is authentic based on the authentication information, wherein the wireless device is configured such that the second determining module determines whether the wake-up signal is authentic after and as a result of the first determining module determining that the wake-up signal is intended for the wireless device; and
  a first initiating module for initiating wake-up of radio circuitry comprised in the wireless device upon determining that the wake-up signal is intended for the wireless device and determining that the wake-up signal is authentic.

12. The wireless device of claim 11, wherein the wireless device comprises:
  a forwarding module for forwarding the authentication information from interface circuitry to processing circuitry comprised in the wireless device for initiating wake-up of radio circuitry comprised in the wireless device, upon determining that the wake-up signal is intended for the wireless device.

13. The wireless device of claim 12, wherein the wireless device comprises:
  a second initiating module for initiating wake-up of the processing circuitry before forwarding the authentication information from the interface circuitry to the processing circuitry, upon determining that the wake-up signal is intended for the wireless device.

* * * * *